United States Patent
Wu et al.

(10) Patent No.: US 7,105,240 B2
(45) Date of Patent: Sep. 12, 2006

(54) PERPENDICULAR MEDIA WITH IMPROVED CORROSION PERFORMANCE

(75) Inventors: Zhong (Stella) Wu, Fremont, CA (US); Raj Nagappan Thangaraj, Fremont, CA (US); Samuel Dacke Harkness, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/742,100

(22) Filed: Dec. 19, 2003

(65) Prior Publication Data

US 2004/0247942 A1    Dec. 9, 2004

Related U.S. Application Data

(60) Provisional application No. 60/475,730, filed on Jun. 3, 2003.

(51) Int. Cl.
*G11B 5/66* (2006.01)
*G11B 5/70* (2006.01)

(52) U.S. Cl. .................................. 428/832.1

(58) Field of Classification Search ............ 428/694 T, 428/694 TS, 611, 668, 900, 836.1, 836.2, 428/832, 832.1; 204/192.12
See application file for complete search history.

(56) References Cited

U.S. PATENT DOCUMENTS

| 6,287,429 B1 * | 9/2001 | Moroishi et al. ........ 204/192.2 |
| 6,699,600 B1 * | 3/2004 | Shimizu et al. ............. 428/692 |
| 2003/0157375 A1 * | 8/2003 | Uwazumi et al. ...... 428/694 TP |

FOREIGN PATENT DOCUMENTS

EP        0330116    * 8/1989

* cited by examiner

*Primary Examiner*—Holly Rickman
(74) *Attorney, Agent, or Firm*—Morrison & Foerster LLP

(57) ABSTRACT

A perpendicular recording medium having a magnetic layer comprising cobalt, platinum, and at least one of molybdenum and chromium. In a preferred embodiment, the perpendicular recording medium comprises granular magnetic regions having oxygen-containing grain boundaries. The magnetic layer of the present invention preferably exhibits improved corrosion resistance while maintaining the magnetic properties suitable for high density perpendicular recording.

5 Claims, 4 Drawing Sheets

PERPENDICULAR MEDIA WITH IMPROVED CORROSION PERFORMANCE

CROSS REFERENCE TO RELATED APPLICATION

This application claims priority from Provisional Patent Application Ser. No. 60/475,730, entitled "Granular Perpendicular Media Design with Improved Corrosion Performance" which was filed Jun. 3, 2003, the entire disclosure of which is hereby incorporated by reference herein.

BACKGROUND OF THE INVENTION

1. Field of the Invention

This invention relates to perpendicular magnetic recording media and to a method of manufacturing the media. The invention relates to high areal density perpendicular magnetic recording media having a magnetic layer exhibiting high corrosion resistance. Furthermore, the invention relates to magnetic materials particularly suitable for forming a magnetic layer exhibiting high corrosion resistance in granular perpendicular recording media applications.

2. Description of the Related Art

Perpendicular recording media are being developed for higher density recording as compared to longitudinal media. The thin-film perpendicular magnetic recording medium comprises a substrate and a magnetic layer having perpendicular magnetic anisotropy, wherein the magnetic layer comprises an easy axis oriented substantially in a direction perpendicular to the plane of the magnetic layer. Typically, the thin-film perpendicular magnetic recording medium comprises a rigid NiP-plated Al alloy substrate, or alternatively a glass or glass-ceramic substrate, and successively sputtered layers. The sputtered layers can include one or more underlayers, one or more magnetic layers, and a protective overcoat. The protective overcoat is typically a carbon overcoat which protects the magnetic layer from corrosion and oxidation and also reduces frictional forces between the disc and a read/write head. In addition, a thin layer of lubricant may be applied to the surface of the protective overcoat to enhance the tribological performance of the head-disc interface by reducing friction and wear of the protective overcoat.

Granular perpendicular recording media is being developed for its capability of further extending the areal recording density as compared to conventional perpendicular recording media which is limited by the existence of strong exchange coupling between magnetic grains. In contrast to conventional perpendicular media wherein the magnetic layer is typically sputtered in the presence of inert gas, most commonly argon (Ar), deposition of a granular perpendicular magnetic layer utilizes a reactive sputtering technique wherein oxygen ($O_2$) is introduced, for example, in a gas mixture of Ar and $O_2$. Not wishing to be bound by theory, it is believed that the introduction of $O_2$ provides a source of oxygen that migrates into the grain boundaries forming oxides within the grain boundaries, and thereby providing a granular perpendicular structure having a reduced exchange coupling between grains. However, the migration of oxygen and the oxidation process produces a granular perpendicular magnetic layer having a porous structure significantly more susceptible to corrosion.

The continuing drive for increased areal recording density in the magnetic recording media industry mandates reduction of the head-to-medium separation, or more particularly the head to magnetic layer separation. As such, an increase in areal density usually requires a reduction in the thicknesses of the intermediary layers, namely the protective overcoat and the lubricant layer, that constitute part of the head to magnetic layer separation. One role of the protective overcoat is to prevent corrosion of the underlying magnetic layer, which is an electrochemical phenomenon dependent upon factors such as environmental conditions, e.g., humidity and temperature. A suitable protective overcoat must prevent migration of ions, such as cobalt (Co) and nickel (Ni), from underlying layers to the surface of the magnetic recording medium which can form defects such as asperities. However, as the protective overcoat thickness is reduced to below 40 Å, the magnetic layer becomes more vulnerable to corrosion. Such low thicknesses reduce the ability of the protective overcoat to maintain adequate corrosion protection.

Accordingly, there exists a need for perpendicular magnetic recording media having a high recording areal density, and a significantly reduced head-to-medium separation while simultaneously providing adequate resistance to environmental attacks, such as corrosion. There exists a particular need for high recording areal density magnetic recording media having a combined protective overcoat and lubricant film thickness less than about 60 Å and exhibiting improved corrosion resistance. There is a need for granular perpendicular recording media having a magnetic layer exhibiting improved corrosion resistance while maintaining the magnetic properties suitable for high density perpendicular recording.

SUMMARY OF THE INVENTION

The invention generally provides a perpendicular recording medium comprising a magnetic layer, wherein the magnetic layer exhibits improved corrosion resistance while maintaining the magnetic properties suitable for high density perpendicular recording. In one embodiment, the magnetic layer comprises cobalt (Co), platinum (Pt), and at least one of molybdenum (Mo) and chromium (Cr), the magnetic layer having perpendicular magnetic anisotropy. In another embodiment, the magnetic layer comprises cobalt-platinum-molybdenum (CoPtMo) having a Mo concentration of about 0.1 atomic % to about 20 atomic %. In another embodiment a magnetic layer of CoPtMo further comprises at least one of Cr, boron (B), tantalum (Ta), niobium (Nb), silicon (Si), nickel (Ni), and titanium (Ti). Another embodiment comprises a magnetic layer of cobalt-platinum-chromium (CoPtCr) comprising Cr in a concentration of about 1 atomic % to about 20 atomic %. In another embodiment the magnetic layer CoPtCr further comprises at least one of the group consisting of Mo, B, Ta, Nb, Si, Ni, and Ti. Another embodiment comprises a method of manufacturing a perpendicular magnetic recording medium comprising depositing a magnetic layer over a substrate, wherein the magnetic layer comprises cobalt, platinum, and at least one of Mo and Cr, the magnetic layer having perpendicular magnetic anisotropy.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The invention generally provides a perpendicular recording medium comprising a magnetic layer, wherein the magnetic layer exhibits improved corrosion resistance while maintaining the magnetic properties suitable for high density perpendicular recording. One embodiment provides a perpendicular recording medium comprising a magnetic layer, wherein the magnetic layer comprises cobalt (Co), platinum (Pt), and at least one of molybdenum (Mo) and chromium (Cr), the magnetic layer having perpendicular magnetic anisotropy. Another embodiment provides a granular perpendicular recording medium comprising a granular magnetic layer, wherein the magnetic layer comprises Co, Pt, and at least one of Mo and Cr, the granular magnetic layer having perpendicular magnetic anisotropy.

Figure 1:
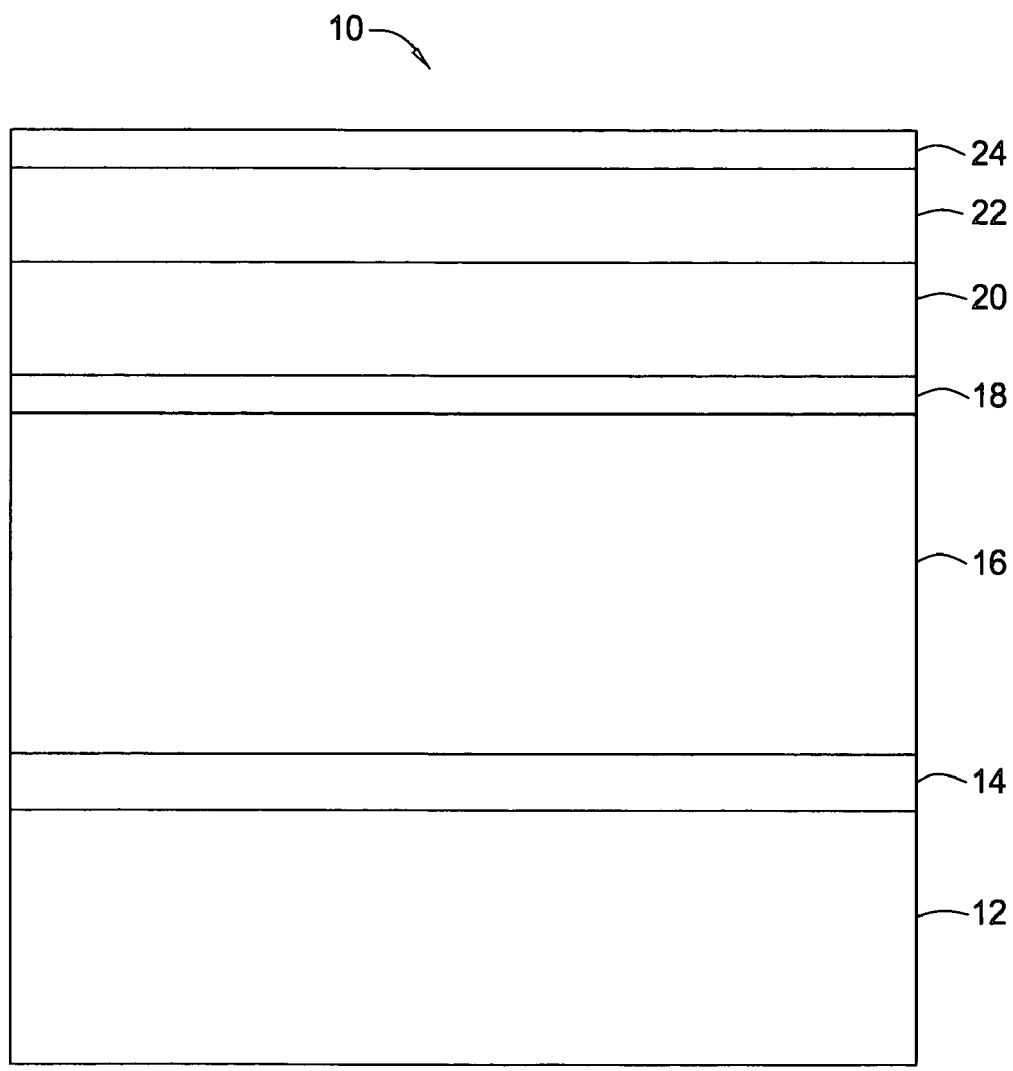
FIG. 1 schematically depicts a cross-sectional view of a portion of the layer structure in accordance with a perpendicular recording medium of present invention.

FIG. 1 schematically depicts a cross-sectional view of the layered structure of an exemplary perpendicular recording medium to which the present invention is applicable. The perpendicular magnetic recording medium 10 typically includes a substrate 12 and various sputtered thin-film layers including an adhesion layer 14 having a thickness in the range of about 10 Å to about 100 Å, a soft magnetic layer 16 having a thickness in the range of about 500 Å to about 4000 Å, a seed layer 18 having a thickness in the range of about 5 Å to about 50 Å, an intermediate layer 20 having a thickness in the range of about 40 Å to about 1000 Å, a magnetic layer 22 of the present invention having a thickness of about 30 Å to about 300 Å, and a protective overcoat layer 24 having a thickness of less than about 50 Å.

Substrate 12 materials include a wide variety of materials such as Al, Al alloy, for example NiP-plated Al alloy, glass, glass-ceramic, ceramic, or other non-magnetic materials such as polymer materials, composite materials, and laminates thereof. The substrate 12 may also be a textured substrate, such as a conventionally NiP-plated textured aluminum substrate or a textured glass-ceramic substrate. Adhesion layer 14 materials may include titanium (Ti), Ti alloys, Cr, and Cr alloys. The soft magnetic layer 16 materials generally include iron (Fe) alloys and Co alloys. Applicable seed layer 18 materials include tantalum (Ta) as well as other materials disclosed in U.S. Provisional Patent Application Ser. No. 60/475,808 filed Jun. 3, 2003, the entire disclosure of which is hereby incorporated by reference herein. The crystalline intermediate layer 20 may include ruthenium (Ru), Ru alloys, and non-magnetic cobalt-chromium (CoCr) alloys. The intermediate layer 20 provides a crystalline template layer for the epitaxial growth of the subsequently deposited magnetic layer 22. The magnetic layer 22 comprises Co, Pt, and at least one of Mo and Cr, wherein the magnetic layer has a crystalline structure and perpendicular magnetic anisotropy. The protective overcoat 24 is typically a carbon-containing protective overcoat, and optionally a lubricant layer may be applied over the protective overcoat.

Many other perpendicular recording media configurations are possible by adding or removing layers below and above the magnetic layer 22 of the perpendicular recording medium structure. For example, there may or may not be one or more adhesion layers, one or more seed layers, one or more intermediate layers, one or more soft magnetic layers, one or more protective overcoats, and one or more lubricant layers. In addition, the magnetic layer 22 may comprise a single layer, or multiple adjacent layers, or a laminated structure having one or more non-magnetic spacing layers. The perpendicular recording medium of the present invention may be a conventional perpendicular recording medium, comprising a non-granular magnetic layer, and more preferably the perpendicular recording medium of the present invention is a granular perpendicular recording medium for higher recording areal density applications.

The magnetic layer 22 of the present invention comprises Co, Pt, and at least one of Mo and Cr, the magnetic layer having perpendicular magnetic anisotropy. In one embodiment, the magnetic layer 22 comprises CoPtMo wherein the concentration of Mo is about 0.1 atomic % to about 20 atomic %, and preferably the concentration of Mo is about 0.5 atomic % to 6 atomic %. For example, a $CoPt_xMo_z$ alloy wherein x is between about 10 atomic % and 30 atomic %, and z is between about 0.1 atomic % and 12 atomic %, and preferably wherein x is between about 15 atomic % and 25 atomic %, and z is between about 0.5 atomic % and 6 atomic %.

In another embodiment the magnetic layer 22 comprises CoPtCr wherein the concentration of Cr is about 1 atomic % to about 20 atomic %, and preferably the concentration of Cr is about 3 atomic % to 12 atomic %. For example, a $CoPt_xCr_y$ alloy wherein x is between about 10 atomic % and 30 atomic %, and y is between about 1 atomic % and 20 atomic %, and preferably wherein x is between about 15 atomic % and 25 atomic %, and y is between about 3 atomic % and 12 atomic %.

In another embodiment the magnetic layer CoPtMo further comprises at least one of Cr, B, Ta, Nb, Si, Ni, and Ti. Still in another embodiment the magnetic layer CoPtCr further comprises at least one of the group consisting of Mo, B, Ta, Nb, Si, Ni, and Ti. For example, a cobalt-platinum-chromium-molybdenum (CoPtCrMo) alloy having a general formula $CoPt_xCr_yMo_z$ wherein x is between about 10 atomic % and about 30 atomic %, y is between about 1 atomic % and 20 atomic %, and z is between 0.1 atomic % and 20 atomic %, and preferably wherein x is between about 15 atomic % and about 25 atomic %, y is between about 3 atomic % and 12 atomic %, and z is between 0.5 atomic % and 6 atomic %.

A method of manufacturing a granular perpendicular magnetic recording medium of the present invention comprises depositing a magnetic layer over a substrate in the presence of oxygen ($O_2$), wherein the magnetic layer comprises Co, Pt, and at least one of Mo and Cr. For example, a granular magnetic layer may be manufactured by co-sputtering a cobalt-platinum (CoPt) target and a Mo target and/or Cr target which may contain B, Ta, Nb, Si, Ni, and Ti, or alternatively B, Ta, Nb, Si, Ni, and Ti targets may be co-sputtered as well. The deposition process may be carried out in the presence of a pre-mixed gas mixture comprising argon (Ar) and $O_2$, wherein the $O_2$ concentration is about 0.1 vol. % to about 10 vol. % of the gas mixture. Deposition of the granular magnetic layer is carried out at relatively high pressures ranging from about 3 mTorr to about 100 mTorr and at relatively low temperatures ranging from about 20° C. (ambient) to about 100° C. The granular magnetic layer having a crystalline structure and composition comprising CoPtMo, CoPtCr, or CoPtMoCr, and optionally further comprise B, Ta, Nb, Si, Ni, and Ti. Not wishing to be bound by theory, it is believed that oxygen is incorporated into the grain boundaries in the form of oxides, and thereby providing reduced coupling between magnetic grains of the magnetic layer, however there may be some inclusion of oxygen within the grain structure.

Many other methods of manufacturing a granular perpendicular magnetic recording medium of the present invention are also possible. For example, in addition or as a substitute to Ar, other inert gases could be used such as krypton, xenon, and neon. Also the gas mixture could be mixed in-situ rather than pre-mixed. For conventional perpendicular (i.e., non-granular) media applications, the manufacture of the magnetic layer of the present invention is carried out without oxygen, for example, the deposition process may be carried out in the presence of Ar or other inert gas, and furthermore may be conducted on a pre-heated substrate to promote compositional segregation for the purpose of reducing exchange coupling between magnetic grains, which is a similar process to that of conventional longitudinal media fabrication.

As illustrated in the following examples, the magnetic layer of the present invention provides improved corrosion performance over conventional perpendicular recording media. The present magnetic layer compositions provide improved corrosion resistance, while maintaining the magnetic properties suitable for high density perpendicular recording.

EXAMPLES

The following tests demonstrate the capabilities of the present invention and such examples are offered by way of illustration and not by way of limitation.

Example 1

Granular perpendicular media samples having the structure illustrated in FIG. 1, were prepared comprising a magnetic layer 22 having the general formula $(CoPt_{18})_{100-x}Mo_x$ of the present invention wherein x equals 0, 1, 2, and 3 atomic %. The magnetic layers of the various samples were produced by co-sputtering a $CoPt_{18}$ target and a Mo target in the presence of a gas mixture of Ar and 2.8 vol. % $O_2$ at 30 mTorr and ambient room temperature. When the crystalline orientation of the magnetic layers was examined by X-ray diffraction (XRD) and rocking curve measurements, it was found that the magnetic layer grew epitaxially with a Co (0002) crystalline orientation exhibiting a narrow full width half height maximum (FWHM) pulse width of the (0002) peak at 3.1°. These measurements confirmed that the magnetic easy axis is oriented substantially in a direction perpendicular to the plane of the magnetic layer.

Figure 2:
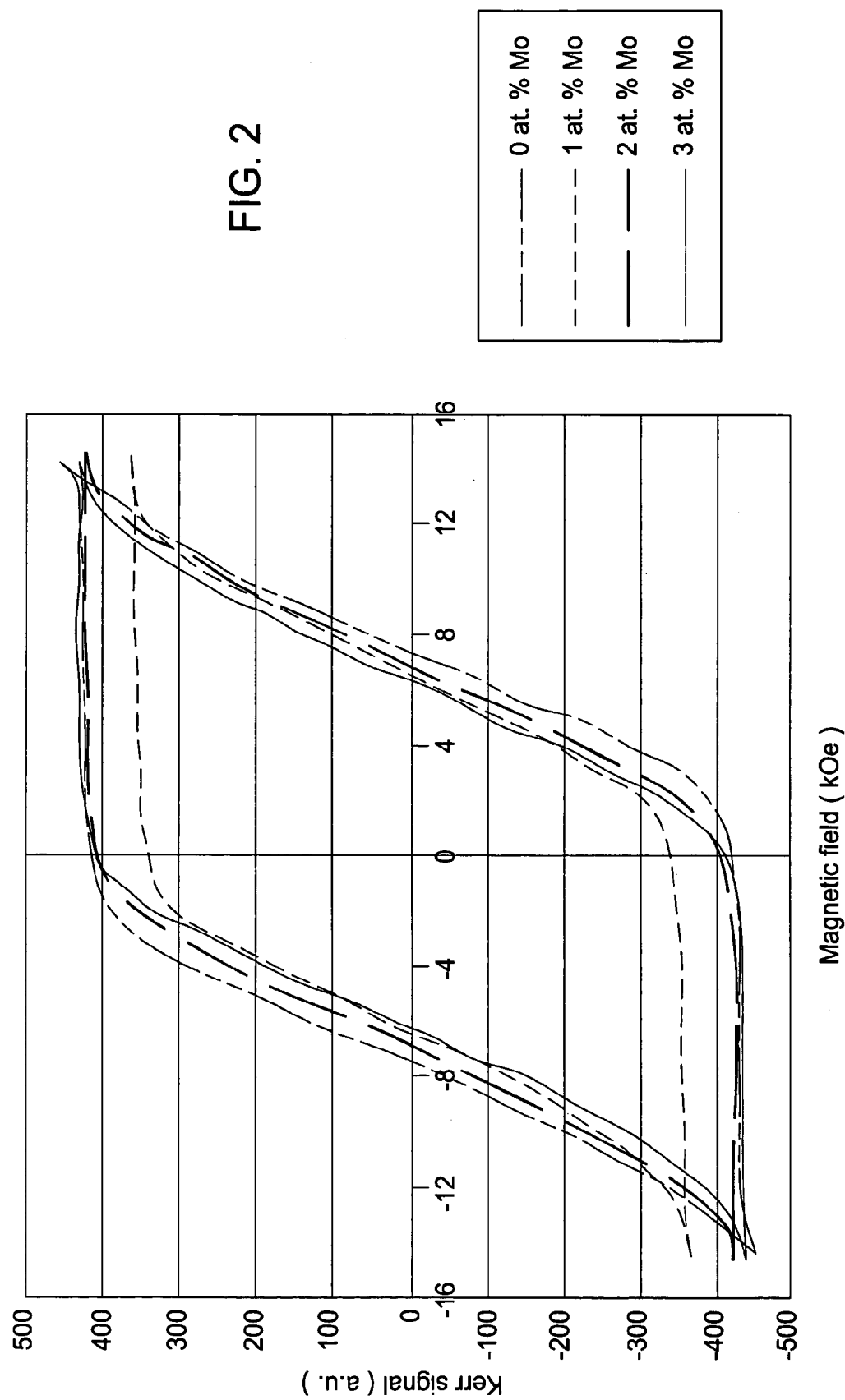
FIG. 2 comparatively depicts the MOKE loops of granular perpendicular media comprising a CoPtMo magnetic layer of an embodiment of the present invention to that of a standard granular perpendicular media having a CoPt magnetic layer.
Figure 3:
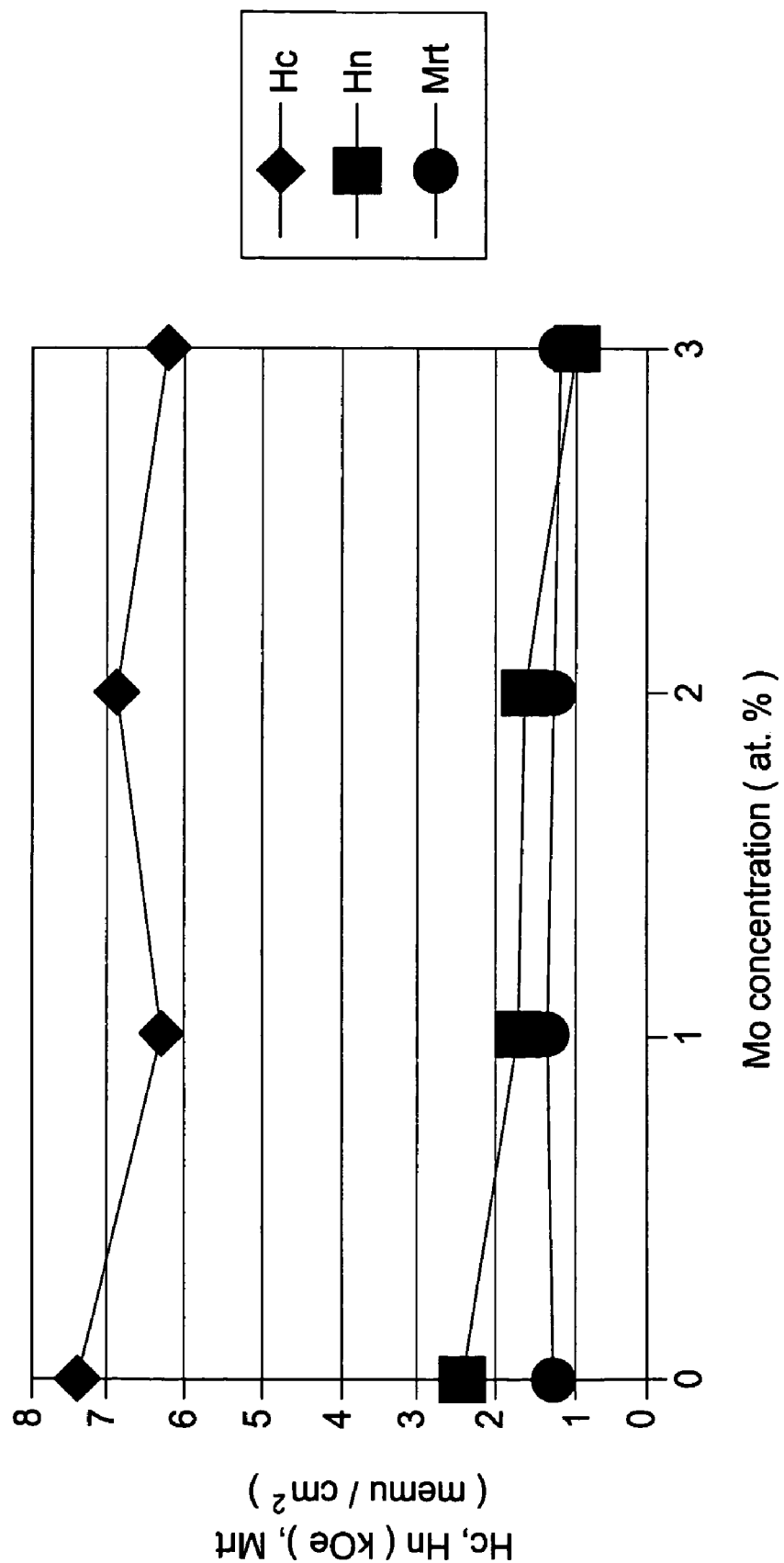
FIG. 3 comparatively depicts the Hc, Hn, and Mrt values of granular perpendicular media comprising a CoPtMo magnetic layer of an embodiment of the present invention to that of a standard granular perpendicular media having a CoPt magnetic layer.

FIG. 2 shows the magneto-optical Kerr effect (MOKE) loops of the 1 atomic % Mo sample, 2 atomic % Mo sample, 3 atomic % Mo sample, and the comparative granular perpendicular media without Mo (i.e., x=0 atomic %). As compared to the 0% Mo comparative sample, the loops of the Mo containing samples are all similarly squared, and the coercivity (Hc), nucleation field (Hn), and saturation magnetization (Ms) values, as measured by this Kerr effect are maintained at relatively constant values. FIG. 3 comparatively depicts Hc and Hn values of the samples, as well as the remanance-thickness product (Mrt) (Mr multiplied by t) obtained from rotating disk magnetometer (RDM) measurements of the samples. Thus, the addition of up to 3% Mo to the $CoPt_{18}$ alloy does not cause significant change in the magnetic properties Ms, Hc, Hn, and loop squareness, which are critical to the recording performance of these materials.

Example 2

Figure 4:
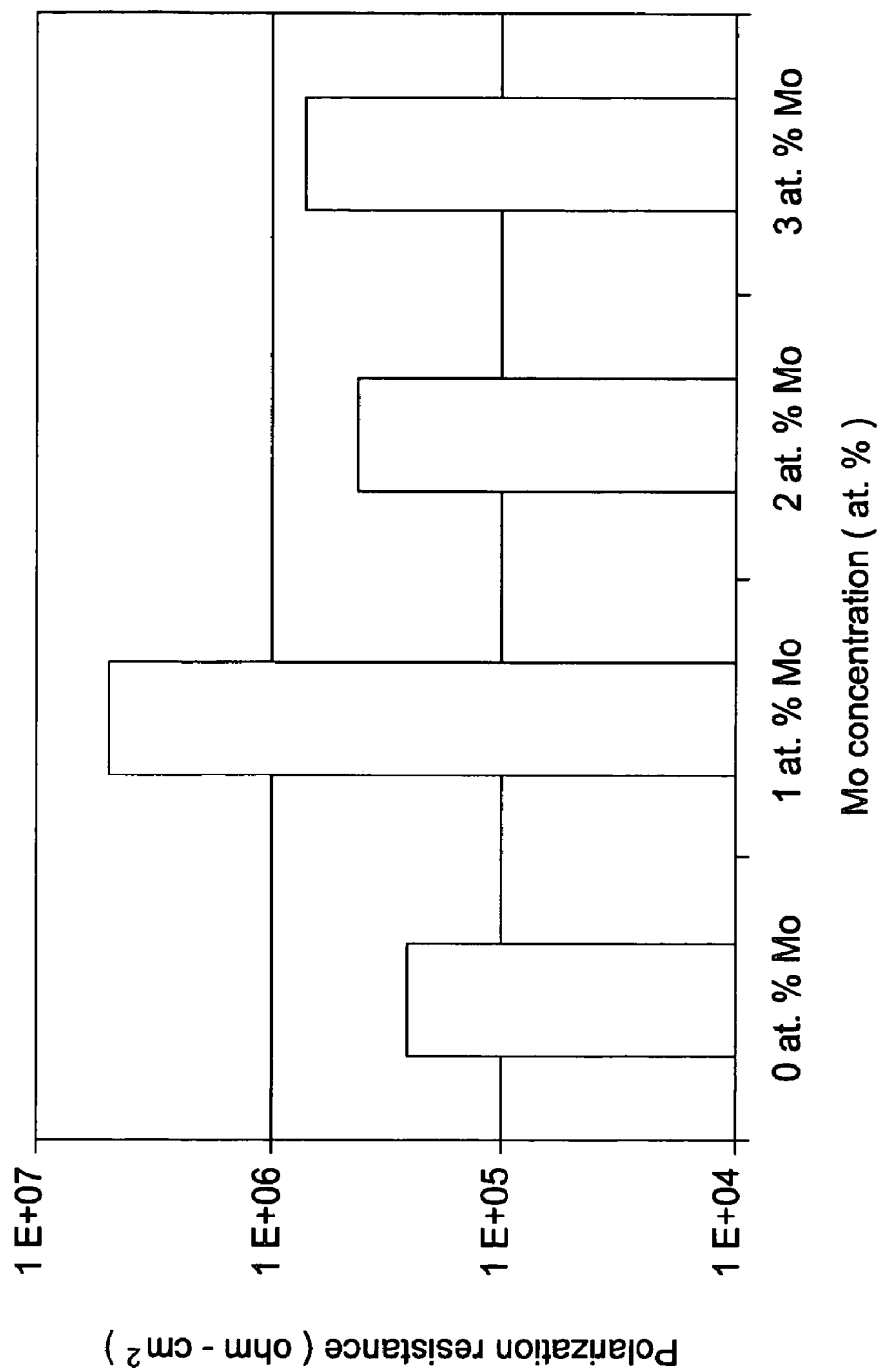
FIG. 4 comparatively depicts the polarization resistance of granular perpendicular media comprising a CoPtMo magnetic layer of an embodiment of the present invention to that of a standard granular perpendicular media having a CoPt magnetic layer.

FIG. 4 comparatively depicts the polarization resistance of the samples described in Example 1, having 1 atomic % Mo, 2 atomic % Mo, 3 atomic % Mo, and 0 atomic % Mo (comparative sample). Electrochemical impedance spectroscopy (EIS) was used to obtain the polarization resistance measurements of the samples. For each sample, polarization resistance measurements were made at ten minute intervals (i.e., t=0, 10, and 20 minutes) at a single location on the surface of the sample. The measurements were performed using an open circuit potential (OCP) and a small 10 mV AC amplitude in the frequency range of about 5 mHz to about 25 kHz to minimize damage to the surface of the samples. All samples showed satisfactory stability over the measurement period and the average polarization resistance values are plotted in FIG. 4. While all the Mo-containing samples exhibit an increase in corrosion resistance as compared to the corrosion resistance of the 0 atomic % Mo sample, the 1 atomic % Mo sample demonstrates over an order of magnitude increase in corrosion resistance.

Not wishing to be bound by theory, it is believed that the polarization resistance data suggests that the addition of Mo increases the corrosion resistance by forming a strong passivating structure around the grains and thereby inhibiting Co or Co ion migration to the protective overcoat or lubricant surface. Therefore, with respect to these particular granular perpendicular media samples manufactured under the conditions described above and having the general formula $(CoPt_{18})_{100-x}Mo_x$, the addition of 1 atomic % Mo clearly demonstrates superior corrosion resistance while maintaining the magnetic properties suitable for high density perpendicular recording.

There are many other methods of manufacture and numerous magnetic compositions of the present invention that may be optimized for a particular method of manufacture and/or particular perpendicular recording medium structure to which the present invention is applicable.

While the foregoing is directed to embodiments of the present invention, other and further embodiments of the invention may be devised without departing from the basic scope thereof, and the scope thereof is determined by the claims that follow.

What is claimed is:

1. A perpendicular magnetic recording medium comprising a chromium-free magnetic layer on a substrate and a protective overcoat or a lubricant layer on the magnetic layer, the magnetic layer comprising cobalt, platinum, and molybdenum, the magnetic layer having perpendicular magnetic anisotropy, wherein the magnetic layer comprises molybdenum at a concentration in the range of about 0.5 atomic % to about 6 atomic % and the magnetic layer has a granular structure comprising grains and a passivating structure around grains, the passivating structure comprising molybdenum and oxygen, wherein the passivating structure provides corrosion resistance by inhibiting Co or Co ion migration from the grains to the protective overcoat or the lubricant layer, further comprising:
an intermediate layer on the substrate, the intermediate layer comprising ruthenium.

2. The perpendicular magnetic recording medium of claim 1, wherein the magnetic layer comprises a material having the general formula $CoPt_xMo_z$, and wherein x is between about 15 atomic % and about 25 atomic %, and z is between about 0.5 atomic % and about 6 atomic %.

3. The perpendicular magnetic recording medium of claim 1, wherein the magnetic layer further comprises at least one of B, Ta, Nb, Si, Ni, and Ti.

4. The perpendicular magnetic recording medium of claim 1, further comprising:
at least one underlayer on the substrate and below the magnetic layer; and the protective overcoat having a thickness of less than about 60 Å.

5. The perpendicular magnetic recording medium of claim 1, wherein the magnetic layer consists of cobalt, platinum, molybdenum and oxygen.

* * * * *